Dec. 28, 1965   D. C. LAVIERI ETAL   3,226,086
POWER LIFT FOR TRUCKS
Filed Jan. 8, 1964   3 Sheets-Sheet 1

INVENTORS
D. C. LAVIERI
B. Z. GORDON

BY Joseph K. Schofield
ATTORNEY

Dec. 28, 1965   D. C. LAVIERI ETAL   3,226,086
POWER LIFT FOR TRUCKS

Filed Jan. 8, 1964   3 Sheets-Sheet 2

INVENTORS
D. C. LAVIERI
B. Z. GORDON
BY
Joseph K. Schofield
ATTORNEY

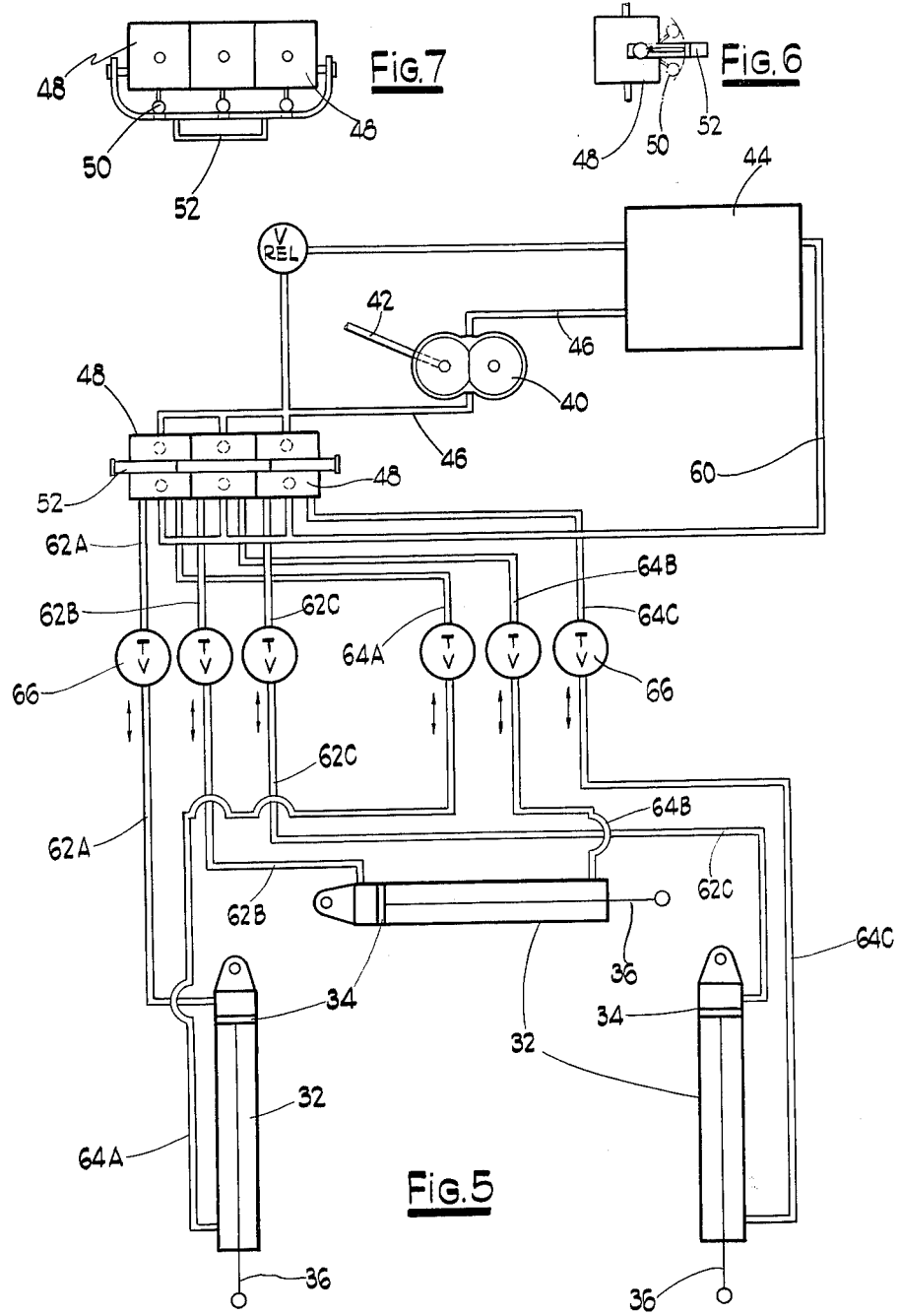

3,226,086
POWER LIFT FOR TRUCKS
Daniel C. Lavieri, New Hartford Road, Winsted, Conn., and Benjamin Z. Gordon, 22 Fernbell Lane, West Hartford, Conn.
Filed Jan. 8, 1964, Ser. No. 336,516
8 Claims. (Cl. 254—93)

This invention relates to power actuated means for lifting extremely heavy loads from slightly above ground level to a position level with the floor of a truck body and to permit lowering the load from truck floor level to substantially ground level.

An object of primary importance of the invention is that horizontal members or arms, on opposite sides of the truck, are movable vertically relative to or on members connected to and depending from the rear of a truck body, the members or arms being raised and lowered by hydraulic or other means while the load is supported by them.

Another object of importance of the invention is that hydraulic operating means for the members or arms may be operated by means, such as variable flow pumps, from a take-off shaft driven by the truck motor or transmission, fluid under pressure being simultaneously supplied as required to elevating and lowering means on opposite sides of the truck for simultaneously raising the arms on which the load is supported.

Another object of importance of the invention is that the elevating means for the load on opposite sides of the truck are supported directly from the ground below the truck, the hydraulic action serving to actuate members of toggle linkage to uniformly raise and lower the arms on which the load is supported while always maintaining the arms and load level.

Another feature of importance of the invention is to support the load when moved to its elevating or lowering position from the ground directly below the rear of the truck so that at no time is there any tendency of the load to upwardly tilt the forward portion of the truck.

Another object of the invention is to provide means to individually vary the supply of fluid under pressure to the different elevating cylinders so that the load may always be maintained in level position while being raised or lowered.

And finally, it is an object of the invention to provide manual means to move and retain the lifting device to a retracted position below the truck when not in use and while the truck is in motion.

With the above and other objects in view, the invention may include the features of construction and operation set forth in the following specification and illustrated in the accompanying drawings.

In the above drawings annexed hereto and forming a part of this specification, I have shown the invention embodied in a loading and unloading means for heavy boxed loads, but it will be understood that the invention can be otherwise embodied and that the drawings are not to be construed as defining or limiting the scope of the invention, the claims appended to this specification being relied upon for that purpose.

In the drawings:

FIG. 5 is a diagram of actuating means for raising and lowering the load carrying members of the device; and FIGS. 6 and 7 are elevation and plane views respectively of the distributing valves.

Figure 1:
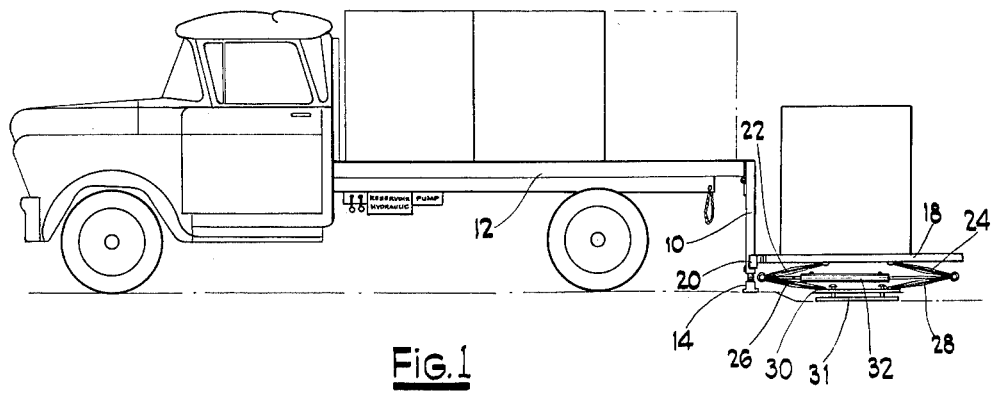
FIG. 1 is a side elevation of a truck having the load elevating device forming the subject of the present invention mounted thereon, the load on the elevating device being shown in its lowered position.

In the above mentioned drawings, there has been shown but one embodiment of the invention which is now deemed preferable, but it is to be understood that changes and modifications may be made within the scope of the appended claims without departing from the spirit of the invention.

Referring more in detail to the figures of the drawing, it will be seen that the lifting device is attached transversely to the rear end of the truck.

Figure 2:
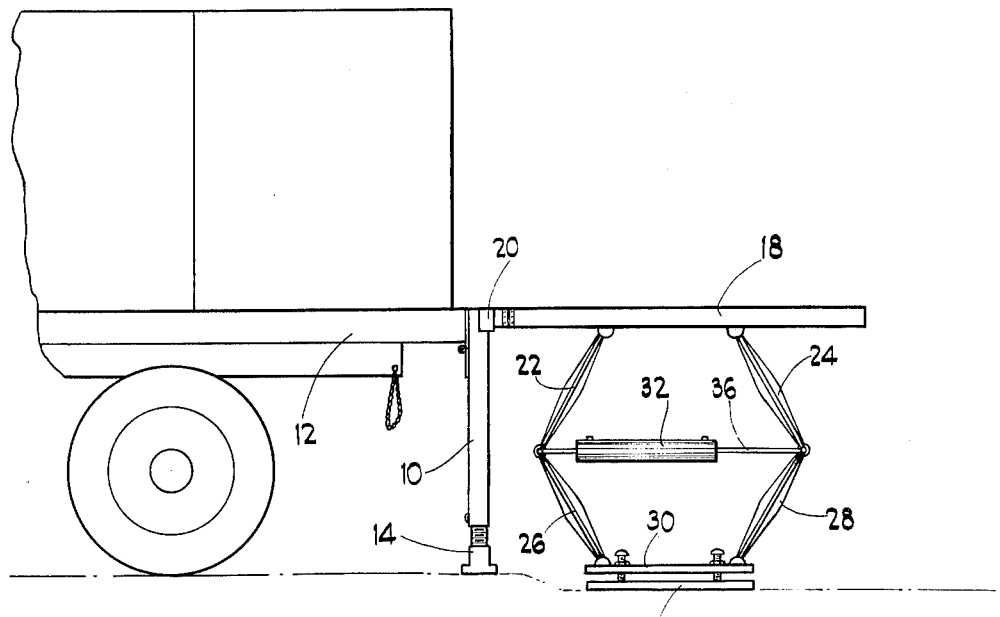
FIG. 2 is a side elevation of the elevating device shown in FIG. 1 with the load carrying members in their raised position.

On opposite sides at the rear of the truck are depending members 10, hinged as shown in FIG. 2 to the rear ends of the side frame members 12 of the truck. These depending members 10 when the lifting device is in use are disposed vertically and adjustments are provided at their lower ends to increase their length as by means of threaded extension members 14. Preferably and as shown, these vertical members 10 may be fastened together at their free or lower ends by an arm 16, thus forming a swinging frame.

Figure 3:
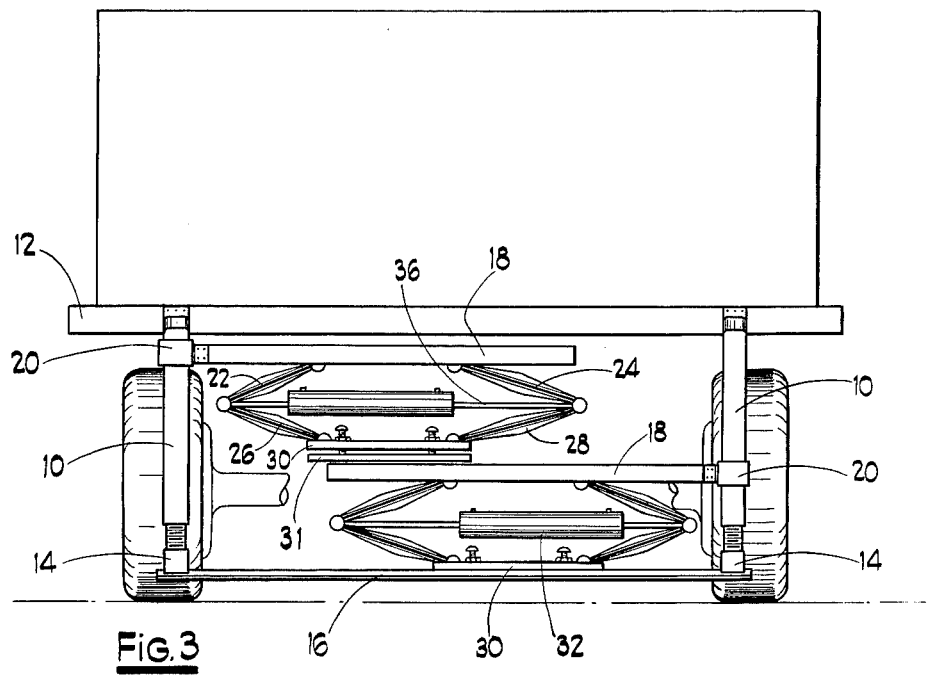
FIG. 3 is a rear elevation of the lifting device showing the members thereof in their inoperative or carrying position.
Figure 4:
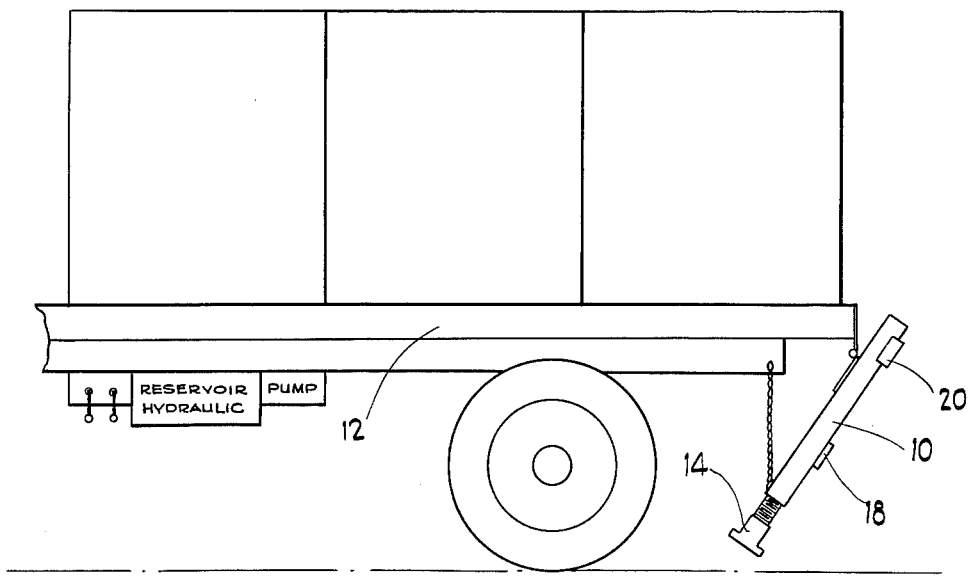
FIG. 4 is a side elevation of the lifting device with the members thereof in retracted or inoperative position as shown in FIG. 3.

When in operative positions the lower ends of the vertical members 10 are adjusted by means of their extensions 14 to rest firmly on the ground directly below the truck. In their inoperative positions, the members 10 and member 16 are obliquely retracted, as shown, by any convenient means. By manual means the frame comprising the vertical members 10 and their connecting member 16 with the elevating means (presently to be described) thereon may be moved to and secured in the position shown in FIG. 4. By releasing the securing means, the members 10 and 16 may be moved from inoperative to operative vertical positions and adapted to firmly engage the ground by adjustment of extension members 14 on each vertical member 10. By these extension members 14 the vertical members 10 may be individually adjusted to contact the ground directly below them and the load being raised or lowered may have its weight supported entirely from the ground below the truck. For this purpose the lower end of each member is provided with the foot members 14 adjustably connected to the vertical members individually as by the threaded connections shown in FIGS. 3 and 4.

Movable vertically on each member 10 and horizontally hinged thereto is an arm 18 extending horizontally on which a part of the load is supported. Each horizontal arm 18 has at its inner end a member 20 to which it is hinged, slidably engaging its vertical member 10 so that the members 18 and 20 may freely slide vertically thereon. In operative position the arms 18 extend rearward of the truck and are disposed parallelly to each other. In this position of the arms 18 the load rests on the upper surfaces of the arms and by uniform movement vertically of the arms the load may be raised or lowered between the level of the floor of the truck body and a short distance above the ground directly below the arms.

Below each horizontal swinging arm 18 is a toggle linkage comprising four articulated members, 22–24–26 and 28. The upper ends of two of the members 22 and 24 are attached hingedly to one of the swinging arms at suitably spaced apart positions. The lower ends of the members 22 and 24 are hinged to the upper ends respectively of a pair of lower toggle members 26 and 28. The lower ends of these lower members 26 and 28 are hingedly attached to a foot or platform member 30 at suitably spaced apart positions.

From the above described mechanism it will be seen that the horizontal swinging arms 18 may be raised or lowered by angular movements of the toggle members.

Between the adjacent hinged ends of the upper and lower toggle members 22–26 and 24–28 for each arm 18 is a hydraulic cylinder and piston unit 32–34. This unit comprises a cylinder 32 having its head end attached to the joint between one of the pairs of upper and lower members. Within the cylinder is piston 34 having its piston rod 36 extending from the opposite end of the cylinder. The outer end of this rod 36 is hingedly attached to the joint between the other pair of upper and lower members for the same arm 18.

From the above description it will be seen that by applying pressure to one end of the cylinder 32 to draw its piston rod 36 inward, the pairs of upper and lower toggle members will be brought into approximate parallelism and thus raise the swinging horizontal arm 18, to which the upper ends of the toggle members are attached, to a position in alignment with the truck floor. By slowly exhausting fluid from this end of the cylinder 32, the horizontal arm 18 will be slowly lowered so that the load partially supported by the arm 18 will be moved downward to a position slightly above the level of the ground below the truck.

Provision is made to admit fluid under pressure to the head end of the cylinder 32 should that be necessary to move the upper and lower toggle members out of parallelism to initiate the lowering movement. The lowering of the arms 18 and the load, however, preferably is controlled by limiting the flow of fluid from the piston rod end of the cylinders 32.

The control of fluid under pressure to the cylinders 32 for the horizontal arms 18 on opposite sides of the truck is effected by a hydraulic system such as shown in the diagram, FIG. 5. The flow of fluid to each cylinder is maintained under control at all times so that the horizontal arms 18 will simultaneously be moved upward and lowered equal amounts, and with the arms 18 always maintained in the same horizontal plane to keep the load level during its movement up and down.

Preferably, particularly for heavy loads for which the lifting device is adapted, there may be provided a third toggle unit and arm extending transversely of the rear of the truck so that the load always may be supported on three of its sides and prevent tilting of the load forward or rearward. As this unit would correspond and operate similarly to those previously described, it is not thought that a description of this unit will be required. In the diagram FIG. 5, controlling means, a third cylinder unit is shown.

This third cylinder and its piston rod may be connected to a third transversely extending arm (not shown) slidably movable between the vertically extending arms 10 of the frame. This third arm 18 also when used will aid in supporting the load closely adjacent the rear of the truck body.

The diagram FIG. 5 illustrates a presently preferred means for operating the parallel rearwardly extending arms and the transversely extending arm if such an arm is employed.

A positive high pressure pump 40 shown as a conventional gear pump is driven from the truck motor by means of a take-off shaft 42 in the usual manner. Operation of this pump forces a liquid such as hydraulic fluid from a reservoir 44 to a discharge line 46. In this discharge line are three three-way valves 48, one for each cylinder supply. Each of these three-way valves 48 may be individually controlled by manually operated levers 50. Also, by a common lever 52 all three individual levers may be controlled simultaneously.

In one position of a three-way valve 48 fluid under pressure is admitted to the head end of a cylinder 32 and discharged from the piston rod end of the cylinder back to the reservoir 44 through appropriate conduits. In the opposite position of a three-way valve 48, the fluid under pressure is admitted to the piston rod end of a cylinder and discharged from the head end of the cylinder.

The conduits for one of the cylinders A are numbered with $a$ exponents. The conduits for cylinders B and C are in every way similar to those for cylinder A and are given exponents $b$ and $c$ respectively. In each conduit to each end of each cylinder are manually controlled throttle valves 66.

Each distributing valve 48 has a common inlet from the reservoir discharge line 46. Also a common return conduit 60 leads from the distributing valves 48 to the reservoir. In addition, there are discharge conduits 62 and 64 leading from each distributing valve 48 to opposite ends of a cylinder. With a distributing valve 48 in one position fluid is admitted under pressure to one end of a cylinder. In the other operative position of a valve 48 fluid under pressure is admitted to the opposite end of the cylinder to which it is connected.

When it is desired to actuate the toggle units to raise or lower a load, the lever 50 for each distribution valve 48 is moved to one of its open positions. This may be done by a single lever in the form of a yoke 52 mounted on the body of the valves 48. First the yoke 52 is forced toward the valves 48 permitted by the slots formed in the side members of the yoke. Moving the yoke upward or downward then moves each of the distributing valves 50 in the same direction. In one direction of the levers 50 for the valves 48 by yoke members 52, fluid under pressure is admitted simultaneously to the same end of each cylinder. In the opposite position of the valve operating levers 50 the fluid under pressure is admitted simultaneously to the opposite ends of the cylinders. In the central position of the levers 50, fluid is locked within both ends of the cylinders so that the linkage and also the vertically movable arms 18 are prevented from moving. Valves 48 may also be operated simultaneously by movement simultaneously of their levers 50.

In each of the conduits 62A–62B–62C and 64A–64B and 64C leading to the opposite ends of the cylinders are throttle valves 66 of conventional type manually controlled to vary the speed of movement of the links of the toggle linkage.

Below each platform member 30 for each toggle nut is a member 31 adjustably attached thereto. By means of this adjustably mounted member 31 each toggle may be adjusted to compensate for variations in ground level.

In operation, as a load is being raised or lowered, the throttle valves 66 may be manually adjusted to uniformly raise or lower the horizontal arms 18 and maintain the load always level.

We claim as our invention:

1. A power actuated lift for trucks comprising,
a ground supported vertically positioned frame attached to and extending below the rear of a truck body,
load carrying means pivotally and slidably mounted on said frame on opposite sides of said truck and extending rearwardly thereof,
and power actuating means for simultaneously raising and lowering said load carrying means.

2. A power actuated lift for trucks comprising,
a ground supported vertically positioned frame attached to and extending below the rear of a truck body,
arms pivotally mounted on said frame and vertically movable on opposite sides of said truck, said arms being movable to parallel positions extending rearwardly thereof,
and hydraulic actuating means for simultaneously raising and lowering said arms.

3. A power actuated lift for trucks comprising,
a vertically positioned frame attached to and extending below the rear of a truck body and having its lower ends engaging and being supported from the ground below said truck, load carrying means pivotally and slidably mounted on said frame on opposite sides of said truck and extending rearwardly thereof,
and power actuating means for simultaneously raising and lowering said load carrying means.

4. A power actuated lift for trucks, comprising,
a vertically positioned frame attached to and extending below the rear of a truck body,
arms pivotally and slidably mounted on said frame on opposite sides of said truck and movable to parallel positions extending rearwardly thereof,
and hydraulic actuating means supported from the ground below the truck for simultaneously raising and lowering said arms.

5. A power actuated lift for trucks, comprising,
a vertically positioned frame attached to and extending below the rear of a truck body,
arms pivotally and slidably mounted on said frame on opposite sides of said truck and extending rearwardly thereof when in operative position,
and hydraulically actuated toggle linkage supported from the ground below the said arms for simultaneously raising and lowering said arms.

6. A power actuated lift for trucks, comprising,
a vertically positioned frame attached to and extending below the rear of a truck body,
arms pivotally and slidably mounted on said frame on opposite sides of said truck and extending rearwardly thereof,
separate toggle units individually supporting said arms from the ground below said truck,
and hydraulic means for operating said toggle units for simultaneously raising and lowering said arms.

7. A power actuated lift for trucks, comprising,
a vertically positioned frame attached to and extending below the rear of a truck body, means to move said frame from its vertical position to an inoperative retracted position,
arms pivotally mounted on said frame on opposite sides of said truck and extending rearwardly thereof when in operative position,
and hydraulic actuating means supported from the ground below the truck for simultaneously raising and lowering said arms.

8. A power actuated lift for trucks, comprising,
a vertically positioned frame attached to and extending below the rear of a truck body,
arms pivotally mounted on said frame on opposite sides of said truck, said arms extending horizontally and rearwardly of said truck,
toggle units supporting said arms from the ground below said truck,
and hydraulic actuating means for operating said toggle units for simultaneously raising and lowering said arms.

References Cited by the Examiner
UNITED STATES PATENTS 2,605,918 8/1952 Roscoe _____ 214—731
3,107,803 10/1963 Glosup et al.

FOREIGN PATENTS 1,019,969 11/1957 Germany.

WILLIAM FELDMAN, *Primary Examiner.*

OTHELL M. SIMPSON, *Examiner.*